United States Patent [19]

McCarthy, Jr.

[11] 4,039,525

[45] Aug. 2, 1977

[54] AQUEOUS PHENOLIC RESOLE DISPERSION CONTAINING CERTAIN HYDROXYALKYLATED GUMS AS INTERFACIAL AGENTS

[75] Inventor: Neil Justin McCarthy, Jr., Warren Township, Middlesex County, N.J.

[73] Assignee: Union Carbide Corporation, New York, N.Y.

[21] Appl. No.: 616,025

[22] Filed: Sept. 23, 1975

[51] Int. Cl.² ............................................... C08L 5/00
[52] U.S. Cl. ...................................................... 260/17.2
[58] Field of Search .......................................... 260/17.2

[56] References Cited

U.S. PATENT DOCUMENTS

| | | | |
|---|---|---|---|
| 2,069,178 | 1/1937 | Dent | 260/29.3 |
| 2,245,245 | 6/1941 | Alexander | 260/29.3 |
| 2,967,836 | 1/1961 | Moffitt | 260/17.2 |
| 3,616,181 | 10/1971 | Stalego | 260/17.2 |
| 3,823,103 | 7/1974 | Harding | 260/17.2 |

OTHER PUBLICATIONS

Chem. Abst. 78:125358q, Aqueous Dispersion Containing a Thermosetting Phenolic Resin, Harding.

*Primary Examiner*—Edward M. Woodberry
*Attorney, Agent, or Firm*—Franklyn Schoenberg

[57] ABSTRACT

Aqueous phenolic resole dispersions are disclosed. The dispersions are produced in the presence of certain hydroxyalkylated gums, such as hydroxyalkylated guar gum, as interfacial agents.

14 Claims, No Drawings

AQUEOUS PHENOLIC RESOLE DISPERSION CONTAINING CERTAIN HYDROXYALKYLATED GUMS AS INTERFACIAL AGENTS

The invention relates to aqueous phenolic resole dispersions containing certain hydroxyalkylated gums as interfacial agents.

In U.S. Pat. No. 3,823,103, there is disclosed aqueous phenolic resole dispersions that are produced in the presence of gum arabic and at least one other gum. It has also been proposed to produce aqueous phenolic resole dispersions in the presence of a mixture of gum ghatti and a thickening agent. In both of these systems, gums arabic and ghatti are the essential interfacial agents, and the second gum or thickening agent permits the production of smaller particle size dispersions and greatly enhances the stability of the dispersions. While dispersions can be made using either the gum arabic or gum ghatti alone, in order to achieve usefully stable dispersions when using the gum alone, undesirably large proportions of gum arabic or gum ghatti would have to be used. This would be undesirable because the large amounts of gum would degrade the final properties of the cured phenolic resole.

Gums arabic and ghatti are anionic stabilizers. As a result, aqueous phenolic resole dispersions that are stabilized by the gum arabic or gum ghatti systems become destabilized and coagulate at pH's below about 3. Further, anionic stabilizers are destabilized by cationic surfactants. Therefore, cationic surfactants should not be added to aqueous phenolic resole dispersions containing the gum arabic or gum ghatti systems, because coagulation would probably occur. Since many useful combinations can be prepared by mixing aqueous phenolic resole dispersions with aqueous addition polymer latexes, in preparing such combinations with the gum ghatti- or gum arabic-stabilized phenolic dispersions, one should avoid using latexes that are stabilized with cationic surfactants.

The present invention is based upon the discovery that certain hydroxyalkylated gums can be used as interfacial agents in producing aqueous phenolic resole dispersions. This discovery was surprising because the hydroxyalkylated gums contemplated herein are nonionic, whereas prior art gum systems that could be used in preparing aqueous phenolic resole dispersions employ anionic gum systems. Additional useful features of the invention are:

a. the hydroxyalkylated gum can be used effectively as a single component stabilizer system in comparatively low proportions;

b. the stabilized rsoles of the invention are more stable at low pH's; and c. the stabilized resoles of the invention are stable in the presence of cationic surfactants.

The invention provides an aqueous dispersion containing dispersed particles of a phenolic resole and a hydroxyalkylated gum as interfacial agent or stabilizer. The invention also provides a process for producing such dispersions which comprises reacting a phenol with an aldehyde in the presence of a basic catalyst, said reaction being carried out for a period of time and at a temperature sufficient to produce a substantially water-insoluble phenolic resole, and dispersing said phenolic resole in an aqueous medium in the presence of a hydroxyalkylated gum.

The aldehydes employed to produce the phenolic resole can be formaldehyde or a material that provides the reaction mixture with formaldehyde or its equivalent such as paraformaldehyde or hexamethylenetetramine, acetaldehyde, furfural, acrolein, or other aldehyde. Formaldehyde is preferred, especially as the aqueous solution known as "formalin".

The phenols that can be employed to produce the resoles used in the invention include unsubstituted phenol (i.e., monohydroxybenzene), and various substituted monohydric and polyhydric phenols. Illustrative examples include o-, m- and p-cresol, ethylphenol, propylphenol, para-tert.-butylphenol and other butylphenols, amylphenol, octylphenol, cyclohexylphenol, nonylphenol, dodecylphenol, and other alkylphenols; paraphenylphenol; styrenated phenol; halogenated phenols such as chloro- and bromophenols; hydroquinone; and bisphenols such as 2,2-bis(4-hydroxyphenyl)propane (bisphenol-A) and bis(4-hydroxyphenyl)methane.

Monohydric phenols employed will normally be dior trifunctional. That is, 2 or 3 of the positions ortho and para to the phenolic hydroxyl will normally be unsubstituted. Bisphenols are usually tetrafunctional, although up to 2 of the respective positions ortho to the phenolic hydroxyl can be substituted.

Ordinarily, from about 0.5 to about 4 moles, and preferably from about 1 to about 3 moles, of aldehyde per mole of phenol will be employed. As is known in the art, more aldehyde is employed when the phenol is a bisphenol than when a monohydric phenol is used.

In producing a phenolic resole, an alkaline catalyst is employed. Specific illustrative catalysts include alkali metal and alkaline earth metal hydroxides, oxides, or carbonates, such as sodium hydroxide, potassium hydroxide, barium hydroxide, calcium oxide, sodium carbonate, and the like; ammoniacal compounds such as ammonia, hexamethylenetetramine, and quaternary ammonium hydroxides; and amines such as ethylenediamine, trimethylamine, dimethylamine, and N,N-dimethyl ethanolamine.

The catalyst is employed in catalytically significant proportions, such as, from about 0.007 to about 0.4, and preferably from about 0.01 to about 0.1 equivalents of catalyst per mole of phenol.

The aqueous dispersions of the invention are produced by a process which comprises reacting a phenol with an aldehyde in the presence of an alkaline catalyst to produce a substantially water-insoluble phenolic resole, and dispersing said resole in an aqueous medium in the presence of a hydroxyalkylated gum.

A convenient way to carry out the process is the following:

Charge the phenol, aldehyde, and catalyst to a reaction vessel having conventional agitation, heat transfer, reflux, and control means. It is convenient to include an inert diluent to act as a reaction medium. Water is preferred, and will normally be added with the aldehyde, since aqueous formaldehyde is the aldehyde used in most cases. The condensation reaction between the phenol and aldehyde is usually initiated by applying external heat to the reaction mixture until the condensation reaction starts. Thereafter, the exothermic nature of the reaction keeps it going at the beginning of the reaction. Temperature control is normally achieved by refluxing at a controlled pressure, with external heating or cooling being employed as needed. The condensation reaction is continued until at least a low viscosity resole is produced. The viscosity should be low enough so that, with the shear available in the reaction vessel, the resole can be broken down into a small particle size resin.

At this point, additional water can be added to the reaction mixture, along with the hydroxyalkylated gum. In order to enhance the stability of the resole, it is sometimes desirable to neutralize the alkaline catalyst before further processing. The pH of the reaction mixture should normally be about 9 or less, preferably about 4 to about 8, and more preferably about 5 to about 7, after the initial phenol/aldehyde condensation reaction is completed, i.e., after neutralization, if required. The particular pH selected depends, in part, upon the nature of the phenol and the end-use application intended for the dispersion.

An important feature of the invention is that the resole is dispersed in water, in the presence of the hydroxyalkylated gum, in situ. That is, the resole is dispersed in water before it is isolated from the reaction mixture. If the resole is isolated from the reaction mixture, and then later re-dispersed in water, it will be difficult to obtain nearly as fine a particle size, nor will the dispersion be as stable, unless very high shear is employed. Also, on a plant-size scale, it is all but impossible to make a resole having a molecular weight as high as those contemplated herein by any route other than the dispersion procedure the same as or analogous to that described herein.

The hydroxyalkylated gum can be in the reaction mixture from the beginning of the phenol/aldehyde condensation reaction. However, it is preferred to carry out the condensation reaction until a low viscosity resin is produced, and then add the hydroxyalkylated gum and more water if necessary. (At this point, the resin may still be at least partially soluble in water. The resole may not become substantially water-insoluble until after neutralization and/or bodying.) Enough water must be present in the dispersion to enable a phase inversion to take place, i.e., to yield a resin-in-water dispersion (the water being the continuous phase). Typical maximum resole solids concentrations are within the range of from about 40 to about 50 weight per cent, determined by measuring the weight loss of a 1.5 gram sample after 3 hours in a 135° C. oven. When the phenol is unsubstituted phenol, the maximum permissible solids content tends to be near the lower end of this range. When the phenol is bisphenol-A, the maximum permissible solids content tends to be near the upper part of the range, and when the phenol is an alkyl phenol, the maximum permissible solids content tends to be near the middle of the range. Of course, more water may be employed. However, for various commercial reasons (such as the desire to keep shipping costs low), it is usually preferred to maintain the water content as low as possible.

As has been pointed out above, the best time to add the hydroxyalkylated gum and additional water (as needed) to the reaction mixture, is not later than that point in the reaction when a low viscosity resin is produced. (The condensation reaction is carried out at elevated temperatures, e.g., 75° to 105° C., and at these temperatures the resole will be liquid.) One or two experiments will probably be required to determine the best point at which to add the hydroxyalkylated gum and water for particular resoles. However, phenolic resin chemists, who have been making resoles commercially for 40+ years, are fully capable of determining that point after having read this disclosure.

The dispersion of the resole in water will be effected by applying shear to the reaction mixture containing substantially water-insoluble resole, water, and hydroxyalkylated gum. Agitation of the reaction mixture is the most convenient way to provide the requisite shear.

The resole should be substantially water-insoluble. While it varies somewhat, depending on the exact nature of the resole, normally to be water-insoluble, the resole will have a weight average molecular weight of at least about 400. The resoles of the invention can have weight average molecular weights of up to about 3000 or more. Weight average molecular weight can be determined by known procedure, e.g., see Moore, "J. Poly. Sci., Part A," 2, 835, 1964.

In order to attain the degree of advancement of the resole that is desired for the end-use application for which it is intended, it is often desirable to subject the resole to elevated temperature for a controlled period of time after addition of the hydroxyalkylated gum and water, and, if it is done, after neutralization of the catalyst. This treatment is often called "bodying" the resin. It is ordinarily carried out at a temperature of from about 80° to 95° C., for a period of about 5 minutes up to 2 hours or more. When the resole is a thermosetting material, the advancement can be followed by periodically testing the resole for its 150° C. gel time (e.g., every 15 to 20 minutes) until the desired degree of advancement is attained. Phenolic resin chemists are well acquainted with this concept, and know how much advancement is needed for particular end-use applications.

The interfacial agents or stabilizers that are used in the invention are certain hydroxyalkyl gums. The gums that are used are guar gum, locust bean gum, and stractan gum. Guar gum is a mucilage obtained from the endosperm of the seeds of the guar plant, Cyamoposis Tetragonoloba (psoralioides). Locust bean gum, also called carob bean gum, is a mucilage obtained from the endosperm of the seeds of Ceratonia siliqua L. Stractan gum is an arabino galactan obtained from trees of the larch (larix) genus. These three gums have in common a molecular structure wherein pendant galactose units are attached to a linear polysaccharide chain. With guar gum and locust bean gum, the polysaccharide chain is composed essentially of mannose units. The molecular structure of stractan gum is not known definitively. The chain probably contains both mixed arabinose and galactose units, having pendant galactose (and possibly some arabinose) units. This description is deduced from the 6:1, galactose: arabinose, ratio of the saccharides in stractan.

The gums are hydroxyalkylated in order to produce the interfacial agents that are used in the invention. Thus, the interfacial agents of the invention can be produced by reacting alkylene oxides such as ethylene oxide, propylene oxide, or mixture thereof with guar gum, locust bean gum, and/or stractan gum. The reaction with alkylene oxide is carried out by known methods. For instance, the gum may be dispersed in a lower alcohol such as isopropyl alcohol, a catalytic amount of a base (e.g., 20 per cent aqueous sodium hydroxide) is added, and then the alkylene oxide is added to the reaction mixture. The hydroxyalkylation is continued at elevated temperature (e.g., 50° to 70° C.) until the desired degree of hydroxyalkylation is attained. The reaction mixture is then cooled, the base catalyst is neutralized with acetic acid, and the salts and other by-products are removed by known methods, as by extraction with isopropyl alcohol or other lower alkanol.

The degree of hydroxyalkylation (i.e., the proportion of alkylene oxide added to the gum) employed depends, in part, upon several factors. Such factors include, for instance, the particular gum employed, the particular alkylene oxide, the particle size desired in the resole dispersion, and the like. The degree of hydroxyalkylation has not been found to be narrowly critical. Of course, there is a certain minimum degree of hydroxyalkylation below which useful product cannot be made. (The unmodified guar gum and locust bean gums fail to yield a phase inversion. The unmodified stractan gum seems to yield a partial phase inversion, but the particle size is too large.) It is within the skill of the art, armed with the teachings contained herein, to determine the minimum degree of hydroxyalkylation required in particular cases.

Hydroxypropyl guar gum having a degree of hydroxypropylation of 6.4 weight per cent (percentage being based on the weight of the hydroxypropylated guar gum) has been employed in producing a dispersion similar to the formulation disclosed below in Example 1. The resulting aqueous resole dispersion had a particle size of about 9 to 38 microns, with an average of about 20 microns, in diameter (by microscope inspection). One would probably not desire a much larger particle size dispersion. The same hydroxypropylated guar gum, when used in a formulation similar to that described in Example 2, yielded a particle size of about 2 to 31 microns, with an average of about 17 microns. This data suggests that the useful minimum degree of hydroxypropylation of guar gum is of the order of 5 weight per cent.

Much higher degrees of hydroxyalkylation than is shown below in the Examples could undoubtedly be employed. However, no additional significant advantage appears to be gained from such higher degrees of hydroxyalkylation.

The hydroxyalkylated gum is employed in the process for making the aqueous phenolic resole dispersion in an amount sufficient to form and stabilize a dispersion of resole particles in water. Effective amounts of the hydroxyalkylated gum will ordinarily be found within the range of from about 0.5 to about 3.0, and preferably from about 0.8 to about 2.0, parts by weight per 100 parts by weight of phenol charged to the reaction mixture. Ordinarily, the gum will be employed in amounts such that the viscosity of the aqueous medium containing the hydroxyalkylated gum will be not more than about 10,000 centipoises at 25° C., down to about 300 to 500 centipoises.

The aqueous dispersions of the invention can be used to produce coatings, adhesives, and to bond fibers, in a manner analogous to prior art phenolic dispersions. The dispersions are usually stable for up to six months or more.

The following examples illustrate the practice of the invention.

EXAMPLE 1

Into a 5-liter, round bottom flask, fitted with reflux condenser, agitator, thermometer and heating mantle, there was charged:

| | |
|---|---:|
| Bisphenol A | 1,000 grams |
| Formalin (40%) | 770 grams |

| -continued | |
|---|---:|
| Aqueous NaOH (25%) | 12 grams |

This mixture was heated under an absolute pressure of 620 millimeters of mercury to 85° C. when the heating mantle was removed and the reaction mixture allowed to rise to reflux at 95° C. through its exothermic heat of reaction. The reaction was held at reflux for 60 minutes by applying additional heat as necessary. At the end of this reflux period, the following were added in the order listed:

| | |
|---|---:|
| Water | 720 grams |
| "Jaguar Gum HE No. 1 | 10 grams |
| Phosphoric acid (42%) | 8 grams |

After mixing vigorously for 15 minutes, the pH was found to be 6.21 and the mixture was found to be phase inverted with a continuous aqueous phase and a dispersed resin phase. This dispersion was heated to 90° C. and held there for 1 hour and 18 minutes whereupon it was cooled to below 35° C. This dispersion had the following properties:

| | |
|---|---|
| Solids | 48 per cent |
| pH | 6.2 |
| Hot plate gel (150° C., 1 g.) | 171 seconds |
| Visc. (Brookfield No. 2 at 30 rpm) | 4,510 centipoises |
| Particle size | 2-20 micron, ave. |
| | ~ 10 micron |

This product settled less than 3% after standing at room temperature for five months. It could be infinitely diluted with water.

The "Jaguar Gum HE No. 1" is sold by Stein Hall and Co., Inc., as a condensation product of ethylene oxide and guar gum. Elemental analysis shows it to be about 20.7 weight % of ethylene oxide with a resultant M.S. or molar substitution ratio of about 1.0. This represents one ethylene oxide unit per monosaccharide unit.

Control 1

This example illustrates the use of a different hydroxyalkylated polysaccharide, hydroxyethylcellulose, and shows how it is totally ineffective in producing phenolic dispersions.

The apparatus and procedure and charge of Example 1 were used with the exception that hydroxyethylcellulose, "Cellosize QP-15000" (12 g.) was substituted for the Jaguar HE No. 1. At no time during a ninety-seven minute agitation period following the water, gum, and acid addition did the material phase invert. Since it became more and more viscous, it had to be discarded as useless. Microscopic examination of this product showed it to be a dispersion of water in resin and as such not a useful phenolic dispersion. It could not be diluted with water.

"Cellosize QP-15000" is a hydroxyethylcellulose manufactured by Union Carbide and was picked because its viscosity (~20,000 at 2.0% in water) is similar to that of Jaguar HE No. 1 (~20,000 at 2.0% in water).

Control 2

A similar experiment with unmodified guar gum has been run and has shown that unmodified guar gum is not effective as a sole dispersing agent for phenolic resins. Cited as Control No. 2 in U.S. Pat. No. 3,823,103.

EXAMPLE 2

This example illustrates the use of hydroxyethyl guar with phenol based dispersions.

The apparatus of Example 1 was used, and the following were charged to the 5-liter flask:

| | |
|---|---|
| Phenol | 1,000 grams |
| Formalin (40%) | 1,390 grams |
| Aq. NaOH (25%) | 83.3 grams |

The phenol, formalin and aqueous NaOH were heated to 70° C., the heating mantle removed, and the temperature allowed to rise by exothermic heat of reaction. The mixture was allowed to react for thirty minutes at atmospheric reflux. At the end of thirty minutes, the following were added in the order listed:

| | |
|---|---|
| $H_2O$ | 600 grams |
| "Jaguar HE No. 1" | 15 grams |
| Aq. $H_2SO_4$ (20%) | 111 grams |

The pH of the resulting mixture was 6.05. The contents of the flask were then heated to about 80° C., held at that temperature for 78 minutes, and cooled below 30° C. The reaction mixture phase inverted to form a resin in water dispersion after about fifteen minutes of bodying.

The resulting dispersion had the following properties:

| | |
|---|---|
| Solids | 41 |
| pH | 6.0 |
| Hot plate gel (2 g. at 150° C.) | 118 seconds |
| Visc. (Brookfield No. 2, 30 rpm) | 3,380 centipoises |
| Particle size | 1-10 microns, Average, 5.5 microns |

The material did not settle after standing refrigerated for three months.

EXAMPLE 3

This example illustrates the use of hydroxypropyl guar (Jaguar HP No. 1) in a Bisphenol A dispersion formula.

The same formulation, procedure and apparatus as used in Example 1, except that 12 grams of Jaguar HP No. 1 were substituted for the 10 grams of Jaguar HE No. 1 and the resin bodied for three hours, eighteen minutes. The final dispersion had the following properties:

| | |
|---|---|
| Solids | 48% |
| pH | 6.35 |
| Hot plate gel | 173 seconds |
| Viscosity | 6,510 centipoises |
| Particle size | 2-13.5μ; av. 8μ |

Jaguar HP No. 1 is produced by Stein Hall and Company from guar gum and propylene oxide. Elemental analysis shows it to be 15.2% propylene oxide by weight with a resultant M.S. (molar substitution) ratio of about 0.5. This represents one propylene oxide unit per every two monosaccharide units.

EXAMPLE 4

This example illustrates the use of hydroxypropyl guar (Jaguar HP No. 1) in a phenol formaldehyde resole dispersion resin.

The same formulation, apparatus and procedure was used as in Example 2 with the exceptions that 15 grams of Jaguar HP No. 1 were substituted for 15 grams of Jaguar HE No. 1 and that the resin was bodied at 80° C. for 45 minutes. The final dispersion had the following properties:

| | |
|---|---|
| Solids | 41% |
| pH | 4.6 |
| Hot plate gel (2 g., 150° C.) | 117 seconds |
| Visc. (Brookfield No. 2, 30 rpm) | 4,210 centipoises |
| Particle size | 2-12 microns; ~6.5 micron average |

EXAMPLE 5

The following materials were added to separate 30-gram samples of a dispersion similar to that described in Example 4:
 1. Sufficient $H_2SO_4$ (20%) to reduce the pH to 2.5.
 2. GAFAC-RE-610 — 0.30 g.
 3. Aerosol A-103 — 0.30 g.
 4. Sipex UB — 0.30 g.
 5. Dicocodimethylammonium chloride — 0.30 g.

After 3 months, only the sample treated with GAFAC was noted to have stiffened considerably, and this sample could be readily remixed.

The said materials are identified as follows:

GAFAC-RE-610 — Polyethoxy phenol phosphate; an anionic surfactant.

Aerosol A-103 — Di-sodium polyethoxy Cg phenol sulfosuccinate; an anionic surfactant Sipex UB — Sodium lauryl sulfate; an anionic surfactant Dicocodimethylammonium chloride is a cationic surfactant By way of comparison, an aqueous resole dispersion similar to that described in Example 4 herein, except that a gum arabic/guar gum system was used as the interfacial agent, broke overnight at a pH of 2.5, and broke after 2 days (with noticeable agglomeration after 1 day) upon the addition of the cationic surfactant dicocodimethylammonium chloride. While the gum arabic/guar gum based dispersion seems to tolerate most anionic surfactants, the three mentioned here, i.e., (2), (3) and (4) above, were found to break the gum arabic/guar gum dispersion within 1 or 2 days.

What is claimed is:

1. An aqueous dispersion containing dispersed particles of a phenolic resole in water, and, in an amount sufficient to stabilize said dispersion, said amount being within the range of from about 0.5 to about 3 parts by weight per 100 parts by weight of phenol employed to produce said resole, of at least one interfacial agent, said interfacial agent being the reaction product of (a) guar gum, locust bean gum, stractan gum, or mixture thereof, with (b) ethylene oxide, propylene oxide, or mixture thereof, the proportion of said (b) component to said (a) component being such that said interfacial agent permits a phase inversion to a resole-in-water dispersion to occur when producing said aqueous dispersion, wherein said resole has a weight average molecular weight within the range of from about 400 to about 3000, as determined by the method of Moore, "Journal of Polymer Science, Part A", Volume 2, page 835, 1964.

method of Moore, "Journal of Polymer Science, Part A", Volume 2, page 835, 1964.

2. The aqueous dispersion of claim 1 wherein said interfacial agent is the reaction product of guar gum with ethylene oxide, propylene oxide, or mixture thereof.

3. The aqueous dispersion of claim 2 wherein said phenolic resole is the base-catalyzed reaction product of a phenol and formaldehyde.

4. The aqueous dispersion of claim 3 wherein said phenol is at least one member of the group consisting of monohydroxybenzene, alkylphenol, and 2,2-bis(4-hydroxyphenyl)propane.

5. The aqueous dispersion of claim 2 wherein said interfacial agent is hydroxypropyl guar gum, wherein said hydroxypropyl guar gum contains at least about 0.16 propylene oxide unit per monosaccharide unit.

6. A process for producing an aqueous dispersion of phenolic resole particles dispersed in water, which process comprises reacting a phenol with an aldehyde in the presence of a basic catalyst for a period of time and at a temperature sufficient to produce a substantially water-insoluble resole, and dispersing said phenolic resole, in situ, in an aqueous medium containing an interfacial agent as described in claim 1, said interfacial agent being employed in an amount sufficient to form and stabilize said dispersion, said amount being within the range of from about 0.5 to about 3 parts by weight per 100 parts by weight of said phenol, wherein said aqueous medium contains sufficient water to enable the production of a resole-in-water dispersion, and wherein the weight average molecular weight of the product phenolic resole in said dispersion is within the range of from about 400 to about 3000, as determined by the method of Moore, "Journal of Polymer Science, Part A", Volume 2, page 835, 1964.

7. The process of claim 6 wherein said aldehyde is formaldehyde.

8. The process of claim 6 wherein said process includes the steps of:
a. reacting a phenol with an aldehyde in a reaction mixture containing a basic catalyst for a period of time sufficient to produce a resole;
b. adding to said reaction mixture said interfacial agent and sufficient water to enable the production of a resole-in-water dispersion; and
c. thereafter subjecting the reaction mixture to elevated temperature for a period of time sufficient to increase the weight average molecular weight of said resole to a value within the range of from about 400 to about 3000;
provided that the pH of said reaction mixture is below about 9 prior to said step (c), wherein the weight average molecular weight is determined by the method of Moore, "Journal of Polymer Science, Part A", Volume 2, page 835, 1964.

9. The process of claim 6 wherein said interfacial agent is the reaction product of guar gum with ethylene oxide, propylene oxide, or mixture thereof.

10. The process of claim 7 wherein said interfacial agent is the reaction product of guar gum with ethylene oxide, propylene oxide, or mixture thereof.

11. the process of claim 8 wherein said interfacial agent is the reaction product of guar gum with ethylene oxide, propylene oxide, or mixture thereof.

12. The process of claim 6 wherein said interfacial agent is hydroxypropyl guar gum, wherein said hydroxypropyl guar gum contains at least about 0.16 propylene oxide unit per monosaccharide unit.

13. The process of claim 7 wherein said interfacial agent is hydroxypropyl guar gum, wherein said hydroxypropyl guar gum contains at least about 0.16 propylene oxide unit per monosaccharide unit.

14. The process of claim 8 wherein said interfacial agent is hydroxypropyl guar gum, wherein said hydroxypropyl guar gum contains at least about 0.16 propylene oxide unit per monosaccharide unit.

* * * * *